United States Patent [19]

Syverson et al.

[11] Patent Number: 5,580,566
[45] Date of Patent: Dec. 3, 1996

[54] PRESERVED POLYSILOXANE EMULSIONS FOR TREATING TISSUES

[75] Inventors: Rae E. Syverson, Fond du Lac; Wendell E. Landin, Appleton; Rebecca S. Walter, Neenah, all of Wis.

[73] Assignee: Kimberly-Clark Corporation, Neenah, Wis.

[21] Appl. No.: 399,279

[22] Filed: Mar. 6, 1995

Related U.S. Application Data

[62] Division of Ser. No. 904,796, Jun. 26, 1992.

[51] Int. Cl.$^6$ ................................................ A01N 25/34
[52] U.S. Cl. ........................... 424/404; 424/401; 514/937
[58] Field of Search ................................ 424/404, 401; 514/937

[56] References Cited

U.S. PATENT DOCUMENTS

| | | | |
|---|---|---|---|
| 4,368,189 | 1/1983 | Mentlik | 424/81 |
| 4,431,632 | 2/1984 | Burns | 424/81 |
| 5,073,372 | 12/1991 | Turner | 424/401 |

FOREIGN PATENT DOCUMENTS

| | | | |
|---|---|---|---|
| 0594433 | 8/1960 | Belgium. | |
| 0226337 | 6/1987 | European Pat. Off. | A61K 7/48 |
| 4136540 | 5/1992 | Germany | A61F 13/15 |
| 965236 | 7/1964 | United Kingdom. | |

*Primary Examiner*—D. Gabrielle Phelan
*Attorney, Agent, or Firm*—Gregory E. Croft

[57] ABSTRACT

Polysiloxane emulsions, useful for treating tissues to improve tactile characteristics, are effectively preserved with at least about 0.1 weight percent of methyl p-hydroxybenzoate. Preferably the preservative further contains one or more p-hydroxybenzoate esters and 2-phenoxyethanol and/or ethylenediaminetetraacetic acid.

16 Claims, No Drawings

PRESERVED POLYSILOXANE EMULSIONS FOR TREATING TISSUES

This is a divisional application of application Ser. No. 07/904,796 filed on Jun. 26, 1992 now abandoned.

BACKGROUND OF THE INVENTION

In the manufacture of polysiloxane-treated tissues, the polysiloxane material to be applied to the tissues can be provided as an aqueous emulsion. For purposes of product safety, it is necessary that the emulsion contain a preservative which is effective for inactivating any microorganisms which may be introduced into the emulsion prior to its use during manufacturing of the treated tissues. Preservative efficacy tests were conducted to determine if a particular preservative was performing adequately. It has been discovered that for certain polysiloxane materials which are particularly useful for treating tissues, the preservatives ordinarily used for such emulsions are insufficient. More specifically, the polysiloxane emulsions will have a very limited window of utility from the time of synthesis to the time of application to the tissue because of the growth of noxious microorganisms in the emulsions. Although preservatives are added to the emulsion by the manufacturer, generally those have been found to be of limited value in preventing the growth and proliferation of microorganisms. Because tissue products may be used to directly contact skin around body orifices where the potential for transfer of materials from the tissue to the consumer may constitute a concern, it is generally good practice to reduce contamination of the tissue in every possible way.

In addition, of course, preventing the growth and proliferation of microorganisms in the polysiloxane emulsion will also increase the useful shelf life of the product and prevent off-color, off-odor or destruction of the emulsion. Many preservatives have been tried, but many of these did not provide adequate preservation. Others were ruled out for reasons related to manufacturing or user safety considerations.

SUMMARY OF THE INVENTION

It has now been discovered that aqueous polysiloxane emulsions useful for treating tissues can be preserved effectively if they are at a substantially neutral pH and contain an effective amount of methyl p-hydroxybenzoate, preferably in combination with 2-phenoxyethanol and/or ethylenediaminetetraacetic acid, and more preferably in combination with 2-phenoxyethanol and other p-hydroxybenzoic acid esters. The effective amounts of the preservatives of this invention are those which provide preservative efficacy, either alone or in combination with other preservatives. Efficacy is established when a formulation meets or passes the requirements of the "Standard Test Method for Preservatives in Water-Containing Cosmetics" described in the American Society for Testing and Materials (ASTM) manual (E640-78). It will be appreciated that with respect to the effective amounts of the various species of preservatives within the scope of this invention, the upper limits on the amounts are essentially open-ended because it is generally always possible to add more of the preservative unless solubility, product safety, cost, emulsion stability, etc. become limiting factors on the upper end of the range.

Hence, in one aspect the invention resides in a substantially neutral aqueous emulsion of a polysiloxane containing at least about 0.1 weight percent and preferably from about 0.1 to about 1 weight percent methyl p-hydroxybenzoate. The optimal amount of the methyl p-hydroxybenzoate will depend on the solids content of the silicone emulsion and the other preservative components which are present in the emulsion. As an example of the variability or the effective amount, it has been discovered that a substantially neutralized aqueous polysiloxane emulsion containing about 40 weight percent polysiloxane and 0.5 weight percent methyl p-hydroxybenzoate and 0.5 weight percent ethylenediaminetetraacetic acid (EDTA) is adequately preserved as determined by the efficacy test referred to above. The amount of methyl p-hydroxybenzoate incorporated into this emulsion was unexpectedly high (the water solubility of methyl p-hydroxybenzoate is only about 0.25 weight percent) apparently due to the presence of the polysiloxane. By way of comparison, a much smaller amount of methyl p-hydroxybenzoate was necessary to effectively preserve the same polysiloxane emulsion when combined with other preservatives. In particular, the emulsion contained about 0.75 weight percent of a preservative mixture containing, on a weight percent basis, of about 70 percent 2-phenoxyethanol, about 15 percent methyl p-hydroxybenzoate, about 6 percent ethyl p-hydroxybenzoate, about 3 percent propyl p-hydroxybenzoate, and about 3 percent butyl p-hydroxybenzoate. This preferred preservative is commercially available from NIPA Laboratories, Inc., Wilmington, Del. under the tradename PHENONIP.

For aqueous polysiloxane emulsions of this invention containing 2-phenoxyethanol, the effective amount of 2-phenoxyethanol is at least about 0.1 weight percent, preferably from about 0.3 to about 1 weight percent or greater, more preferably from about 0.4 to about 0.7 weight percent, and most preferably about 0.5 weight percent.

For aqueous polysiloxane emulsions containing EDTA, the effective amount of EDTA can be at least about 0.1 weight percent, preferably from about 0.1 to about 1 weight percent or greater.

For aqueous polysiloxane emulsions containing other esters of p-hydroxybenzoic acid, such as ethyl, propyl, butyl, etc., the aggregate amount of these other esters can be at least about 0.01 weight percent and preferably from about 0.01 to about 1 weight percent.

In another aspect, the invention resides in a method for preserving an aqueous emulsion of a polysiloxane polymer or polymer blend comprising: (a) substantially neutralizing the emulsion to a pH of from about 6.5 to about 8, preferably about 7; (b) adding an effective amount of methyl p-hydroxybenzoate, preferably from about 0.1 to about 1 weight percent methyl p-hydroxybenzoate, to the emulsion; and (c) thoroughly mixing the emulsion. Other variations of the method of this invention include adding any of the preservative materials referred to above or any combinations thereof.

In another aspect, the invention resides in a tissue which has been surface-treated with a substantially neutral polysiloxane emulsion containing methyl p-hydroxybenzoate, either alone or in combination with any of the preservative materials described above. The dry weight percent add-on amounts of the preservative materials will depend upon the add-on amount of the polysiloxane emulsion and the amount of the preservatives within the emulsion. In general, the add-on amounts will be very small. For methyl p-hydroxybenzoate, the tissue add-on amount can be about $4.4 \times 10^{-6}$ weight percent or greater, preferably from about $4.4 \times 10^{-6}$ to about 3 weight percent. For EDTA, the tissue add-on can be about $4.4 \times 10^{-6}$ weight percent or greater, preferably from about $4.4 \times 10^{-6}$ to about 3 weight percent. For 2-phenoxyethanol, the tissue add-on amount can be about $1.3 \times 10^{-5}$ weight percent or greater, preferably from about $1.3 \times 10^{-5}$ to about 3 weight percent. For the other esters of p-hydroxybenzoic acid such as ethyl, propyl and butyl, the aggregate tissue add-on for these species can be about $4.4 \times 10^{-7}$ weight percent or greater and preferably from about $4.4 \times 10^{-7}$ to about 3 weight percent.

The aqueous polysiloxane emulsion for treating tissues can contain from about 5 to about 90 weight percent polysiloxane solids, preferably from about 15 to about 65 weight percent. Emulsion tissue add-on amounts can range from about 0.001 to about 300 weight percent, depending upon the polysiloxane content and the desired properties imparted to the tissue. For a 40 weight percent polysiloxane emulsion, the tissue add-on amount of the emulsion can be from about 0.003 to about 40 weight percent, preferably from about 1.25 to about 12.5 weight percent. Polysiloxanes which are particularly useful for treating tissues in an aqueous emulsion form include those known for their softening effects on cellulosic textile materials, which particularly include silicone fluids which have been modified with various functional groups. Examples of such polysiloxanes include alkyl-, aralkyl-, aryl-, polyalkyleneoxide-, silanic hydrogen-, silanol-, epoxy-, amino-, and mercapto-modified polysiloxanes, as well as blends and copolymers of these polysiloxanes. Non-reactive polydimethylsiloxanes can also be used, however.

Neutralization of the aqueous emulsion, if initially alkaline, can be achieved with any suitable acid. Phosphoric acid is preferred. If the emulsion is initially acidic, sodium hydroxide can be used to bring the pH up to the desirable level. It has been found that a substantially neutral pH (from about 6.5 to about 8.0) is necessary for the preservative to be effective for such polysiloxane emulsions. A neutral pH is also preferred for reasons related to operator safety in a mill environment in that neutral pH emulsions are less likely to cause skin or eye irritation if contact is made. Preparation of the preserved emulsions of this invention require that the emulsion be thoroughly mixed and homogeneous after the preservative materials are added in order to avoid phase separation and inadequate preservative efficacy.

The following preservatives were tested in accordance with the foregoing ASTM preservative efficacy test in an aqueous polysiloxane (about 40 weight percent) emulsion having a pH of about 10, and failed: (1) SUTTOCIDE A (1.0%) and methyl p-hydroxybenzoate (0.5%). SUTTOCIDE A is sodium hydroxymethylglycinate and is commercially available from Sutton Laboratories, Inc., Chatham, N.J.; (2) SUTTOCIDE A (1.0%) and ethylenediaminetetraacetic acid (EDTA) (0.5%); (3) SUTTOCIDE A (1.0%) and NUOSEPT 95 (0.3%). NUOSEPT 95 is a mixture of bicyclic oxazolidines, commercially available from Huls America, Inc., Piscataway, N.J.; (4) NUOSEPT 95 (0.3%); and (5) SUTTOCIDE A (1.0%).

The following preservatives were tested in accordance with the foregoing ASTM preservative efficacy test in an aqueous polysiloxane emulsion which had been neutralized from a pH of about 10 to a pH of about 6–7, and failed: (1) OXABAN A (0.2%) and METHYLPARASEPT (0.1%) and PROPYLPARASEPT (0.1%). OXABAN A is dimethyloxazolidine available commercially from Angus Chemical Co., Northbrook, Ill. METHYLPARASEPT is methyl p-hydroxybenzoate available commercially from Tennaco Chemical Corp., Piscataway, N.J. PROPYLPARASEPT is propyl p-hydroxybenzoate available commercially from Tennaco Chemical Corp., Piscataway, N.J.; (2) OXABAN A (0.1%) and MYACIDE SP (0.1%). MYACIDE SP is dichlorobenzyl alcohol and is commercially available from Boots MicroCheck, Nottingham, U.K.; (3) GERMABEN II E (0.1%). GERMABEN II E is a mixture of 0.1% methyl p-hydroxybenzoate, 0.1% propyl p-hydroxybenzoate, and 0.2% GERMALL II. GERMALL II is diazolidinyl urea available commercially from Sutton Laboratories, Inc., Chatham, N.J. GERMABEN II E is also available commercially from Sutton Laboratories, Inc.

The following preservatives were considered but rejected for reasons related to product safety: formaldehyde, formaldehyde donors, QUATERNIUM-15, chloro-methyl-isothiazolinone, methyl-isothiazolinone, and sodium o-phenylphenate.

Hence, because of the rigorous standards which must be met to provide an adequately preserved polysiloxane emulsion for use in treating facial tissues, for example, it was not obvious to identify a preservative which would satisfy such requirements. As mentioned above, the large majority of the preservatives tested failed to adequately preserve the polysiloxane emulsion.

It will be appreciated that the foregoing examples, given for purposes of illustration, are not to be construed as limiting the scope of this invention which is defined by the following claims and includes all equivalents thereto.

We claim:

1. An aqueous polysiloxane emulsion consisting essentially of polysiloxane, a preservative and water and containing from about 15 to about 65 weight percent polysiloxane solids, said emulsion having a pH of from about 6.5 to about 8 and at least about 0.1 weight percent methyl p-hydroxybenzoate as a preservative.

2. The emulsion of claim 1 wherein the amount of methyl p-hydroxybenzoate is from about 0.1 to about 1 weight percent.

3. The emulsion of claim 1 wherein the preservative further comprises at least about 0.1 weight percent ethylenediaminetetraacetic acid.

4. The emulsion of claim 3 wherein the amount of ethylenediaminetetraacetic acid is from about 0.1 to about 1 weight percent.

5. The emulsion of claim 3 wherein the amount of ethylenediaminetetraacetic acid is about 0.5 weight percent.

6. An aqueous polysiloxane emulsion consisting essentially of polysiloxane, methyl p-hydroxybenzoate, 2-phenoxyethanol and water, said emulsion having a pH of from about 6.5 to about 8 from about 5 to about 90 weight percent polysiloxane solids, at least about 0.1 weight percent methyl p-hydroxybenzoate, and at least about 0.1 weight percent 2-phenoxyethanol.

7. The emulsion of claim 6 comprising from about 0.1 to about 1 weight percent 2-phenoxyethanol.

8. The emulsion of claim 1 wherein the preservative further comprises at least about 0.1 weight percent of one or more p-hydroxybenzoic acid esters selected from the group consisting of ethyl p-hydroxybenzoate, propyl p-hydroxybenzoate and butyl p-hydroxybenzoate.

9. The emulsion of claim 1 wherein the preservative comprises about 0.5 weight percent methyl p-hydroxybenzoate and about 0.5 weight percent ethylenediaminetetraacetic acid.

10. An aqueous polysiloxane emulsion having a pH of from about 6.5 to about 7.5 comprising about 0.75 weight percent of a preservative containing about 70 weight percent 2-phenoxyethanol, about 15 weight percent methyl p-hydroxybenzoate, about 6 weight percent ethyl p-hydroxybenzoate, about 3 weight percent propyl p-hydroxybenzoate, and about 3 weight percent butyl p-hydroxybenzoate.

11. A method for preserving an aqueous emulsion consisting essentially of a polysiloxane polymer or polymer blend and a preservative, said emulsion containing from about 15 to about 65 weight percent polysiloxane solids, comprising:
   a. neutralizing the emulsion to a pH of from about 6.5 to about 8;
   b. adding a preservative comprising at least about 0.1 weight percent methyl p-hydroxybenzoate to the emulsion; and
   c. thoroughly mixing the emulsion.

12. The method of claim wherein the amount of methyl p-hydroxybenzoate is from about 0.1 to about 1 weight percent.

13. The method of claim 11 wherein the preservative further comprises at least about 0.1 weight percent ethylenediaminetetraacetic acid.

14. The method of claim 13 wherein the amount of ethylenediaminetetraacetic acid is from about 0.1 to about 1 weight percent.

15. The method of claim wherein the preservative further comprises at least about 0.01 weight of one or more p-hydroxybenzoic acid esters selected from the group consisting of ethyl p-hydroxybenzoate, propyl p-hydroxybenzoate, and butyl p-hydroxybenzoate.

16. The method of claim 15 wherein the aggregate amount of the p-hydroxybenzoic acid esters is from about 0.01 to about 1 weight percent.

* * * * *